United States Patent [19]

Simon et al.

[11] Patent Number: 5,557,544
[45] Date of Patent: Sep. 17, 1996

[54] SPECTROMETER WITH DYNAMICALLY CODED COMPONENTS

[75] Inventors: Arno Simon, Karlsruhe; Norbert Rapp, Bühl, both of Germany; Jean-Michel Weil, Scheibenhard, France

[73] Assignee: Bruker Analytische MeBtechnik GmbH, Germany

[21] Appl. No.: 164,390

[22] Filed: Dec. 9, 1993

[30] Foreign Application Priority Data

Dec. 11, 1992 [DE] Germany ............... 42 41 905.0

[51] Int. Cl.⁶ ............... H01J 5/02; G02B 27/00
[52] U.S. Cl. ............... 364/525; 364/571.01; 235/375; 356/346; 356/318; 250/339.07; 359/895
[58] Field of Search ............... 235/375; 356/346, 356/318; 364/550, 525, 577, 571; 341/138, 139; 250/339.07, 339.08

[56] References Cited

U.S. PATENT DOCUMENTS

| | | | |
|---|---|---|---|
| 4,303,984 | 12/1981 | Houvig | 364/571 |
| 4,418,392 | 8/1983 | Hata | 364/571 |
| 4,575,803 | 3/1986 | Moore | 364/550 |
| 4,763,285 | 8/1988 | Moore et al. | 364/551.01 |
| 4,787,053 | 11/1988 | Moore | 364/550 |
| 4,845,649 | 7/1989 | Eckardt et al. | 364/571.02 |
| 5,397,898 | 3/1995 | Schübel | 250/339.01 |

FOREIGN PATENT DOCUMENTS

| | | | |
|---|---|---|---|
| 3419800 | 12/1984 | Germany | G01J 3/42 |
| 3419739 | 12/1984 | Germany | G01J 3/42 |

OTHER PUBLICATIONS

Article by Larry Sklar A. et al.; "National laboratory provides laser resource in cytometery"; Laser Focus World, v27, n8, p61(12) 1991.

Larry et al.; "National Laboratory provides laser resource in cytometery"; Laser FocusWorld; v.27, N.8 P61(12) Aug. 1991.

FTIR spectroscopy for the analytical and research laboratory Article from J. Sellors, published Apr. 1992, pp. 23–30.

Primary Examiner—Emanuel T. Voeltz
Assistant Examiner—Kamini Shah
Attorney, Agent, or Firm—Walter A. Hackler

[57] ABSTRACT

In an analytic spectrometer (50) having a central computer (9), permanently installed and exchangeable components (5), such as a radiation source, a detector, a beam splitter, a filter, external measurement probes and the like, each of which exhibiting a readable data carrier (7) with encoded data of parameters characterizing the respective component (5), the data media (7) can be written to and contains changeable time dependent data concerning the history and/or the actual properties of the corresponding component (5) for example length of operation, performance deterioration parameters or calibration curves of the component (5). These data can be continuously adjusted by the central computer (9) to the current state of the component (5) so that the data medium (7) connected to the component (5) can immediately supply information concerning the current actual properties of the component (5) when installing the component (5) in another spectrometer.

15 Claims, 2 Drawing Sheets

SPECTROMETER WITH DYNAMICALLY CODED COMPONENTS

BACKGROUND OF THE INVENTION

The invention concerns an analytic spectrometer in particular an infrared (IR) spectrometer with a central computer, permanently installed and exchangeable components such as a radiation source, a detector, a beam splitter, a filter, external measurement probes and the like, whereby the exchangeable components each exhibit a readable data medium with encoded data of parameters characterizing the respective optical component.

A spectrometer of this kind is, for example, known from the article "FTIR Spectroscopy for the Analytical and Research Laboratory" by J. Sellors in the American journal "American Laboratory", April 1992, pages 23 through 30.

In the Fourier-transform infrared (FTIR) spectrometer described therein, which is principally utilized for research, a large number of software-controlled internal components are provided for which leads to an enormous number of possible permutations. In a system of this kind it is therefore important that each current configuration of system components be recognized in a manner which is as automatic as possible and communicated to the central computer. In order to automatically determine the type of at least those system components which are subject to exchange these components are equipped with a bar-code which with the assistance of bar-code reading instruments can be read-off from the corresponding component as information concerning the component type and transferred to the central computer.

In addition information concerning the position of the corresponding component is transferred to the computer so that a system representation of the current spectrometer configuration can be reproduced in the memory of the central computer at any time and as a consequence decisions concerning the operation or the change of the spectrometer can be derived by means of the central computer.

The known spectrometer further provides for a sub-memory allocation in the central memory in which special data concerning component types which are recognizable with the assistance of the bar-code can be stored. These types of data can, for example, be calibration curves characterizing the performance of the corresponding component type. In this fashion the central computer of the spectrometer is provided with the capability of reaching complicated decisions concerning the areas of applicability of the spectrometer, of determining possible incompatibilities or insufficiencies in the current configuration, and of demanding appropriate assistance.

In addition to the bar-code, resistor networks or appropriately formed contact plugs can be utilized as data storage media for the respective exchangeable system components. In all spectrometers known to date, these data media contain however only very limited amount of information, namely the information concerning the type of the corresponding components and possibly their production date. All other important information concerning the component type, for example fundamental calibration curves or function diagrams have been up to this point stored in the normally plentiful memory of the central computer which is always part of a spectrometer. The information concerning the corresponding system components encoded onto the data medium was therefore, up to this time, exclusively passive and static and did not allow for a change in the stored data, for example, for the purpose of adjusting an individual current parameter value which characterizes the instantaneous state of the system component.

When therefore in a known spectrometer, a component was exchanged with another component, it was necessary to usually first determine the individual properties of this component through measurements before the spectrometer could be rendered operational. This is particularly disadvantageous for system components which were removed from another spectrometer since individual data concerning the components which possibly had already been taken in the other spectrometer did not automatically move during the transfer of the component to the new installation location. Only in the event that the two spectrometers communicate with each other and are capable of exchanging data, stored in their central computers, concerning their system components can this problem occurring in conventional spectrometers be solved. Such a networking of spectrometers is, however, difficult and is normally not done.

A further problem consists in the handling of exchange components which, for example, a customer of a spectrometer manufacturer receives as substitutes for defective components. In this situation the customer is interested in the particular data of the replacement component and the manufacturer is interested in the characteristic data known to the customer of the exchange component, which possibly can only be reconstructed with a certain degree of difficulty. In both cases it is only possible to supply this individual data concerning a spectrometer component in a manner which is separate from the component itself.

It is therefore the purpose of the present invention to present an analytic spectrometer whose components can be utilized in a much more flexible fashion in various locations in equivalent spectrometers or in other spectrometers whereby the respective components, without any additional measures, such as measurements of characteristic properties of the component, can be installed in any arbitrary spectrometer and be immediately available for operation.

SUMMARY OF THE INVENTION

This purpose is achieved in accordance with the invention in that the data medium can be written to and contains changeable, time dependent data concerning the history and/or the current properties of the respective exchangeable components such as operation time, performance deterioration parameters or calibration curves of the components. In this fashion each exchangeable component in particular exchangeable components from the manufacturer or components which a user would like to take from one spectrometer and install in another, carry their own individual history in particular their calibration curves with them. In this fashion the spectrometer in which such an "intelligent" construction component is installed can be immediately placed into operation without the need for any additional measures. Even the utilization of components from another spectrometer is, in this fashion, greatly simplified. The corresponding exchangeable components can simply be installed in another spectrometer at an arbitrary point in time. Since all spectrometers are usually calibrated and, since at this time the components also carry the information concerning their individual calibration, there is a standardized interface between the spectrometer and the spectrometer components which allows for a permutation of all important components without additional difficulties. By way of example a user's defective spectrometer components can be directly replaced from stock without having to carry out difficult measurements of the component or having to effect a particular selection.

In a preferred embodiment of the invention devices for reading the time dependent data of exchangeable components which is encoded on the data medium as well as devices for transferring these data to the central computer are provided for and a program for decoding these data and for making a decision on the basis of the current data is implemented in the central computer. In this fashion the central computer of the spectrometer can automatically record and evaluate the corresponding data.

In an embodiment of the inventive spectrometer, appropriate devices, for example sensors, are provided for detecting changes in the data, corresponding to parameters of the exchangeable components, which are stored on one or more data media.

In a particularly preferred improvement of this embodiment devices for transferring data signals to the central computer on the basis of detected changes of parameters as well as devices for writing on the data media of the exchangeable components are provided for. In this embodiment, a program for the processing of the incoming data signals is implemented in the central computer for controlling the devices for writing as well as for the automatic adjustment of changed parameter data of a component on its data media. In this fashion properties of the corresponding component which change during operation in the spectrometer can be stored in an automatic fashion on the data medium of the corresponding component in the form of appropriate current data.

An embodiment is particularly preferred in which the inventive spectrometer is a Fourier transform infrared (FTIR) spectrometer. In other embodiments one could however be dealing with a nuclear magnetic residence (NMR), an electron spin residence (ESR), an ion cylotron residence (ICR) or a mass-spectrometer.

Also within the framework of the present invention is an exchangeable, preferentially optical component of a spectrometer of the above mentioned kind with a readable data medium with encoded data of parameters characterizing the component in which the data medium can be written-to and which contains changeable, time-dependent data concerning the history and/or the current properties of the components, such as length of operation, performance deterioration parameters, or calibration curves of the component.

An embodiment is thereby particularly advantageous with which data which cannot be changed is also stored on the data media of the component whereby this data should not, to the extent possible, be capable of being overwritten or deleted. Examples for this type of non-changeable data are the type of respective optical component and its date of manufacture.

In an improvement of this embodiment, in addition to the manufacturing date of the component, critical points in time for the taking of new data for stored time-dependent data and/or for the checking and/or maintenance and/or an exchange of the components are also stored. In this fashion it is possible to issue pulses to the central computer of the spectrometer at the respective appropriate point in time which initiate an appropriate reaction of the system or a request for external changes.

In a further preferred embodiment component data are stored on the data medium which correspond to parameters which characterize the differing interactions of the components with various spectrometers and/or other exchangeable components. This facilitates a particularly high flexibility when using such a dynamically coded component.

In embodiments of the exchangeable optical component according to the invention, the data medium can be a chip, in particular, an EPROM or a Flash-ROM. In other embodiments the data medium is a magnetic memory.

Although, the actual operation time of the components in accordance with the invention can be determined and stored with the assistance of a clock which is nearly always provided for in the central computer of the spectrometer, in a user-friendly embodiment of the components in accordance with the invention a clock which is preferentially connected to the data medium is provided for which automatically starts when the components enter into operation and stops when operation ceases to store the respective current length of operation of the component as the last value.

Also within the framework of the current invention is, finally, a method for the operation of a spectrometer or of an exchangeable component of the above described kind with which, during the operation of the spectrometer, the data stored on the data medium corresponding to the current parameters of the exchangeable components in the spectrometer are automatically sampled by the central computer and in the event of a change of one or more parameters, appropriate new data are stored onto the data medium.

The invention is more closely described and explained below in the embodiments represented in the drawing. The features which can be derived from the description and the drawing can find utilization in other embodiments of the invention either individually or collectively in arbitrary combination.

DESCRIPTION OF THE PREFERRED EMBODIMENT

Figure 1:
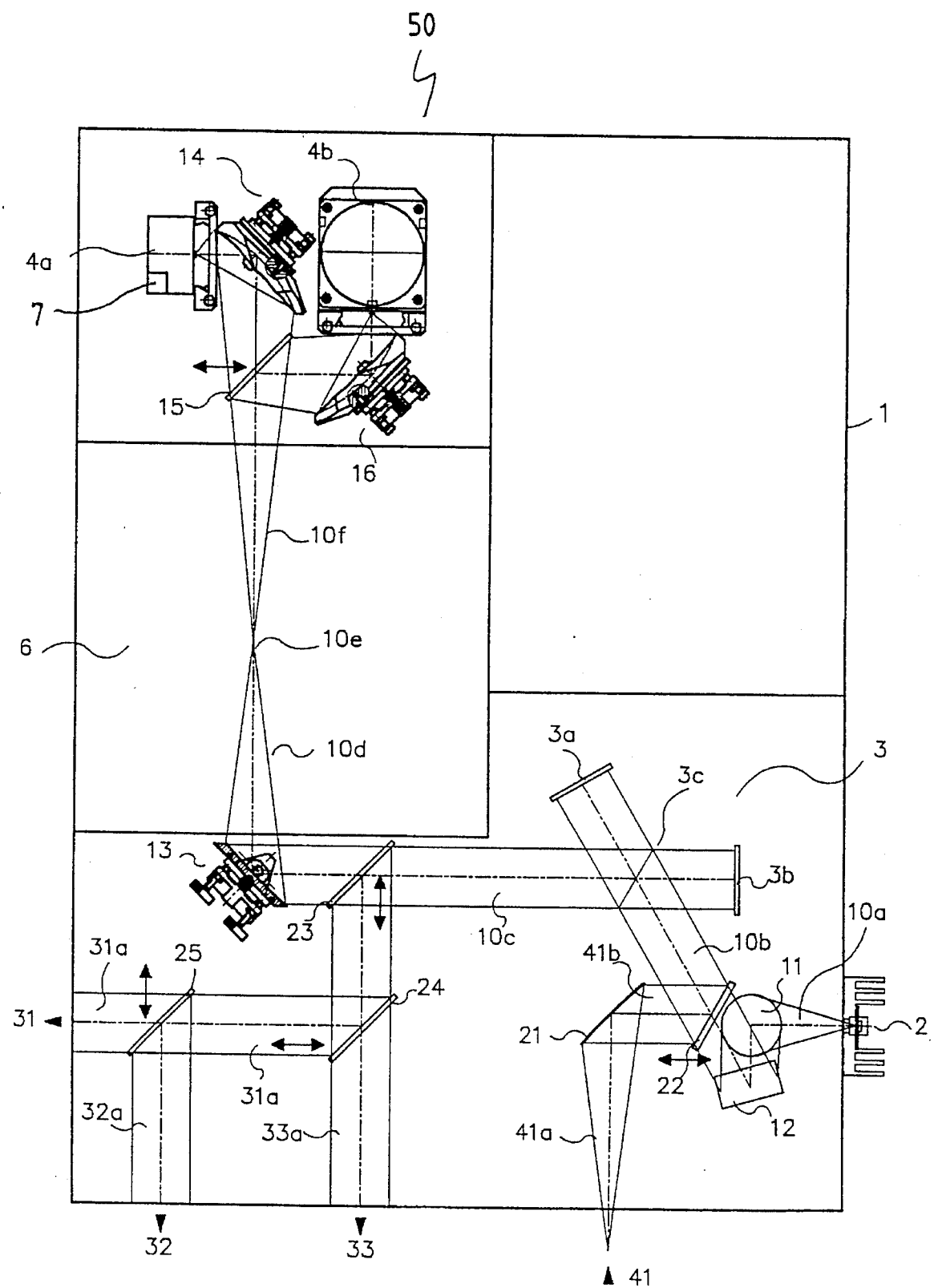
FIG. 1 shows the schematic optical path in a IR-spectrometer in accordance with the invention.

In particular, FIG. 1 schematically shows a Fourier spectrometer 50 in accordance with the invention, whose general construction has become known by the company publication IFS 66 of the company Bruker Analytische Messtechnik GmbH. A radiation source 2, an interferometer 3 with movable mirrors 3a, 3b and a beam splitter 3c as well as two alternate detectors 4a, 4b are integrated in or on a spectrometer housing 1, whereby a data medium 7 is schematically indicated in the drawing on the detector 4a.

In internal operation, an initially divergent beam of light 10a, departing from the source 2, impinges on a concave mirror 11, to enter into the interferometer 3 as a parallel beam 10b via a planar mirror 12. The parallel light beam 10c exiting the interferometer 3 impinges via a focusing deflecting mirror 13 as converging light beam 10d into the sample region 6. A sample to be examined can be located at focus 10e. Following the focus the divergent light beam 10f leaves the sample region 6 and impinges via a further focusing mirror 14 onto the detector 4a. Alternatively one can switch onto the detector 4b via the focusing mirror 16 by folding-in, sliding-in, in general, by moving-in the planar mirror 15.

Additional movable mirrors 22 through 25 are located in the optical path by means of which a light beam can be coupled in or out. In this fashion, with the assistance with the fixed mirror 21 and the movable mirror 22 it is possible to deflect a light beam 41*a,b* into the spectrometer housing 1 via the entrance 41 from an external instead of the internal source. The double-arrowed symbol on the mirror is intended to indicate that, it can be tilted, displaced, or rotated to deflect the radiation beam. This transpires, in general, under computer control. If, for example, the mirror 22 is to be removed from the radiation beam 10*b* it is possible for the light leaving the internal source 2 to travel into the interferometer 3. If the mirror 22 is moved-in, the light coming from the source 2 is blocked but that which is coming from an external source via entrance 41 and mirror 21 gains entrance to the interferometer 3. In general the example shows, in addition to the entrance 41, 3 exits, 31–33 for deflecting-out the radiation beam 10*c* exiting the interferometer 3 which then merges into the exiting beam 31*a*, 32*a* or 33*a* to, by means of the mirror 23, 24 or 25, be introduced onto external samples.

In the above described spectrometer 50 the radiation source 2, the beam splitter 3*c* as well as the detectors 4*a* and 4*b* are, for example, components which normally become used-up after a certain lifetime or utilization-time and must be replaced. These exchangeable spectrometer components, which are not shown in the drawing, could also be external light sources or probes with a measuring head and optical fibers which, for example, couple-in external light via the entrance 41 into the spectrometer 50. The external probes usually suffer a change in transmission during operation which is due to abrasion or scratching of the outer surface of the measuring head or to breakage of fibers the optical fiber bundle and the like. Filter elements, which are also not shown are included among those exchangeable components 7 whose lifetime is limited and therefore which are usually not permanently mounted into the spectrometer 50.

In accordance with the present invention all or at least a part of these exchangeable, preferentially optical, components 5 for the spectrometer 50 are provided with a writeable data medium 7 which contains the time dependent changeable data concerning the history and/or the current properties of the respective component 5 such as the operation time, certain performance deterioration parameters or calibration curves of the components. An exchangeable component 5 of this kind with a data media 7 is, for example, the detector 4*a* shown in FIG. 1.

Figure 2:
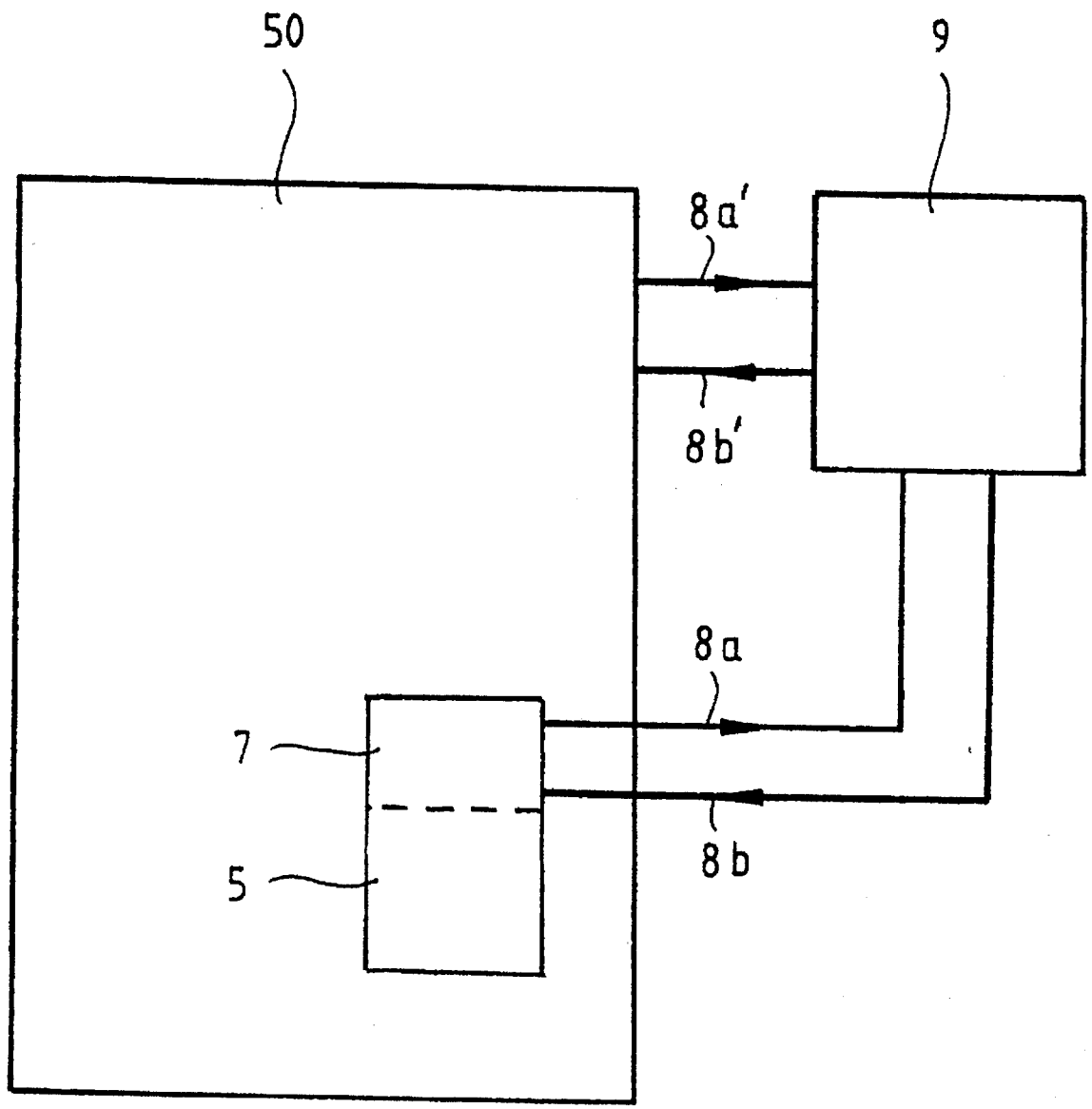
FIG. 2 shows a highly simplified functional diagram of the spectrometer in accordance with the invention with a central computer, an exemplary spectrometer component and the corresponding data storage medium.

Shown very schematically in FIG. 2 is the spectrometer 50 in which a component 5, intended to represent all other exchangeable components, exhibiting an attached data medium 7 is represented. By means of a read line 8*a* it is possible for the likewise only very schematically shown central computer 9 of the spectrometer 50 to read the data of the exchangeable component 5 which is stored on the data media 7. Via an additional data line, the write line 8*b*, it is possible for the central computer 9 to adjust the time changing data of the components 5 on the data media 7 to the actual state of the component 5, in that the appropriate old data is overwritten with the newer current data.

Such an adjustment can take place either continuously, in regular intervals, or in irregular intervals based on corresponding signals from other parts of the spectrometer 50. The communication means which connect the central computer 9 to the spectrometer 50, are shown schematically in FIG. 2 as a read line 8*a*' and a write or command line 8*b*'. By means of these data lines it is possible for the central computer 9, for example, to also sample the current state of the components 5 on the basis of measurement values which are available to the spectrometer 50. On the basis of these sampled measurement values, by way of example calibration curves of the component 5, it is possible, for the central computer 9 to update the appropriate data on the data medium 7 via the write line 8*b*.

In this fashion it is possible to always keep the data of the exchangeable components 5 on the data medium 7 current so that, for example, when utilizing the components 5 in another spectrometer, no preparatory measures such as calibration measurements and the like are necessary with respect to the component 5. The component now carries its own information about its history or its current state with it. In contrast to previous solutions in known spectrometers where this information was, at best, stored in the extensive memory of the central computer, an efficient interface for the element-specific data is realized. Thereby a re-recording of component-specific data from one central computer to another is unnecessary.

Although the solution in accordance with the invention of a dynamic encoding of preferentially optical exchangeable components 5 of a spectrometer 50 appears more complicated and more expensive than the previous solution, a significant increase in flexibility of use of the exchangeable components is, however, achieved between different locations in, possibly, different spectrometers. In this fashion, for example, still operative exchangeable components of a defective spectrometer can be reused in another spectrometer without any additional preparatory measures. Also in the event components received by a customer of a spectrometer manufacturer as a new or rebuilt substitute component in exchange for a component which no longer functions in an acceptable fashion, the transfer of the component-specific information can take place automatically in both directions.

The customer can install the exchange component immediately in his spectrometer and the manufacturer automatically receives the essential information concerning the current state of this component from the component sent back by the customer which normally substantially simplifies a repair. The exchangeable optical components 5 can also have non-changeable data stored on on their data medium 7, by way of example, their date of manufacture or their component type. Clearly, during use of the component 5, these data should neither be overwritten nor deleted. This type of "passive" data which are not subject to any time change, are already present with known spectrometers on the important exchangeable components, for example with the assistance of a bar-code labeling, a resistive network, or a corresponding contact plug. This passive encoding does not however allow for changes in data so that an updating of data concerning changeable parameters of the corresponding component was, up to now, not possible. All important changeable component data was, up to this point, solely stored in the central computer.

Chips, in particular EPROMs or FLASH-ROMs can be utilized as data media 7 for the recording of time dependent data of the exchangeable optical components 5. The data medium 7 can, however, also be a magnetic memory. In addition with particularly important and expensive components a clock which is preferentially connected to the data media 7 can be provided for which, during operation of the component 5 automatically starts and when operation ceases stops to record the respective current operation time of the component 5 as a final value.

The invention is limited not only to IR-spectrometers of the above described type rather also includes all other kinds of conceivable spectrometer types for example NMR, ESR, ICR, or mass-spectrometers. Exchangeable components 5 with attached data media 7 in accordance with the invention can therefore for example also be used with radio frequency (HF) coils, probeheads, amplifiers, filters, power supplies, gradient generation systems or sample heaters.

We claim:

1. An analytic spectrometer comprising:

a central computer;

an interchangeable component;

readable data medium means integral with the interchangeable component and adapted for storing encoded data concerning at least one of a history and a changeable current property of the interchangeable component;

read/write means connected to the data medium means for reading encoded data from and for writing encoded data to the data medium means; and interface means connected between the read/write means and the central computer for transferring the encoded data to and from the central computer.

2. The analytic spectrometer of claim 1, wherein the central computer is adapted to decode the encoded data and to process decisions on the basis of the decoded data.

3. The spectrometer according to claim 1 further comprising, sensor means for detecting changes in the encoded data.

4. The spectrometer of claim 3, wherein the sensor means generates data signals in response to detected changes in the encoded data and wherein the central computer is adapted to process the encoded data for controlling the read/write means to automatically update changed parameters of the interchangeable component.

5. The spectrometer of claim 1, wherein the spectrometer is a Fourier transform (FT)-infrared (IR)-spectrometer.

6. The spectrometer of claim 1, wherein the spectrometer is one of an NMR, ESR, ICR or mass spectrometer.

7. A method for the operation of the spectrometer of claim 1 comprising the steps of: storing encoded data on a readable data medium means, the encoded data corresponding to a current parameter of the exchangeable component of the spectrometer; automatically sampling the encoded data, during operation of the spectrometer, by means of a central computer; and, in the event of a change in the current parameter, storing new data to the data medium means.

8. An interchangeable FTIR spectrometer optical component comprising a readable data medium means integral with the interchangeable optical component and adapted for storing encoded data concerning at least one of a history and a changeable current property of the interchangeable optical component, and adapted for storing non-changeable encoded data which cannot be overwritten or deleted.

9. The component of claim 8, wherein a production date of the optical component and at least one critical point in time for at least one of a data-updating of the stored non-changeable data, a component checking, a component maintenance, and a component exchange are stored on the data medium means.

10. The component of claim 8, wherein the encoded data stored on the data medium means comprise parameters characterizing varying interactions of the optical component with at least one of a different spectrometer and a second interchangeable optical component.

11. The component of claim 8, wherein the data medium means is one of an EPROM or a Flash-ROM.

12. The component of claim 8, wherein the data medium means is a magnetic memory.

13. The component of claim 8, further comprising a clock, which is adapted to automatically start when the component is brought into operation and to stop when operation ceases, whereby a current operation time of the component is stored as a last value.

14. A method for the operation of the interchangeable optical component of claim 8 comprising the steps of: storing encoded data on a readable data medium means, the data corresponding to a current parameter of the interchangeable component; automatically sampling the encoded data, during operation of the spectrometer, by means of a central computer; and, in the event of a change in the parameter, storing appropriate new data to the data medium means.

15. An FTIR spectrometer comprising:

an interchangeable optical component;

readable data medium means integral with the interchangeable optical component and adapted for storing encoded data concerning at least one of a history and a changeable current property of the interchangeable optical component and adapted for storing non-changeable encoded data;

read/write means connected to the data medium means for reading encoded data from and for writing encoded data to the data medium means;

a central computer adapted to decode the encoded data and to process decisions on the basis of decoded data and adapted to process the encoded data for controlling the read/write means to automatically update changed parameters of the interchangeable optical component;

interface means connected between the read/write means and the central computer for transferring the encoded data to and from the central computer; and sensor means, communicating with the read/write means, for detecting changes in the encoded data and for generating data signals in response to the detected changes in the encoded data.

* * * * *